United States Patent
Petersen et al.

(10) Patent No.: US 11,838,264 B2
(45) Date of Patent: *Dec. 5, 2023

(54) METHOD AND SYSTEM FOR INTERNET PROTOCOL ADDRESS ALLOCATION

(71) Applicant: Charter Communications Operating, LLC, St. Louis, MO (US)

(72) Inventors: Matthew Petersen, Highlands Ranch, CO (US); Mark Teflian, Parker, CO (US); Thomas Holloran, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,567

(22) Filed: Feb. 14, 2022

(65) Prior Publication Data

US 2022/0166748 A1 May 26, 2022

Related U.S. Application Data

(63) Continuation of application No. 16/919,350, filed on Jul. 2, 2020, now Pat. No. 11,283,762.

(51) Int. Cl.
*H04L 61/5046* (2022.01)
*H04L 61/5007* (2022.01)
*H04L 61/5076* (2022.01)

(52) U.S. Cl.
CPC ...... *H04L 61/5046* (2022.05); *H04L 61/5007* (2022.05); *H04L 61/5076* (2022.05)

(58) Field of Classification Search
CPC ............. H04L 61/5007; H04L 61/5046; H04L 61/5076

USPC ........................................................ 709/245
See application file for complete search history.

(56) References Cited

U.S. PATENT DOCUMENTS

| | | | |
|---|---|---|---|
| 5,884,024 A * | 3/1999 | Lim | H04L 63/126 710/200 |
| 7,558,863 B1 | 7/2009 | Sitaraman et al. | |
| 7,756,107 B1 | 7/2010 | Blair et al. | |
| 7,788,345 B1 * | 8/2010 | Sukiman | H04L 61/5061 709/227 |
| 8,560,658 B2 | 10/2013 | Bedare et al. | |
| 8,615,571 B2 | 12/2013 | Bower, III et al. | |

(Continued)

*Primary Examiner* — David P Zarka
(74) *Attorney, Agent, or Firm* — Young Basile Hanlon & MacFarlane, P.C.

(57) ABSTRACT

Methods and systems for Internet Protocol (IP) address allocation optimization. A method includes a data collector collecting IP address information from sources of IP address inventory and an optimization controller generating a data set from the collected IP address information, minimizing IP address allocations for network components in a network using IP address allocation and IP address utilization for a network component from the data set, minimizing IP address inventory costs using IP address inventory and IP address utilization from the data set and IP address transactional costs, tracking the IP address inventory, sending configuration information to network component(s) to change respective IP address allocations based on minimized IP address allocation, sending transaction information to IP address provider(s) to change the IP address inventory based on minimized IP address inventory costs, and performing the above on a defined interval.

16 Claims, 6 Drawing Sheets

(56) References Cited

U.S. PATENT DOCUMENTS

| | | |
|---|---|---|
| 9,661,522 B2 | 5/2017 | Kavunder et al. |
| 9,980,158 B2 | 5/2018 | Kim et al. |
| 10,681,003 B2 | 6/2020 | Andrew et al. |
| 10,999,892 B2 | 5/2021 | Li et al. |
| 11,088,988 B2 | 8/2021 | Chuu |
| 11,283,762 B2* | 3/2022 | Petersen ............. H04L 61/5061 |
| 2003/0163584 A1* | 8/2003 | Anderson ........... H04L 67/1027 |
| | | 709/245 |
| 2006/0062228 A1* | 3/2006 | Ota .................... H04L 12/2856 |
| | | 370/401 |
| 2008/0189769 A1* | 8/2008 | Casado ................ H04L 63/102 |
| | | 726/4 |
| 2014/0052860 A1* | 2/2014 | Duggal ............... H04L 61/2514 |
| | | 709/225 |
| 2016/0381080 A1* | 12/2016 | Reddem ................ H04L 63/205 |
| | | 726/1 |
| 2019/0238501 A1* | 8/2019 | Chuu .................. H04L 61/5014 |
| 2019/0281072 A1* | 9/2019 | Al Khater ........... H04L 63/1425 |
| 2021/0029081 A1* | 1/2021 | Jin ........................ H04L 67/306 |
| 2022/0166748 A1* | 5/2022 | Petersen ............. H04L 61/5061 |

\* cited by examiner

| ADS Name | ADS Version | Date/Time Pulled | Hostname | NetworkId | Cidrblock | Subnetmask | Total IP Addresses | Leased IP Addresses |
|---|---|---|---|---|---|---|---|---|
| ADS_01900_IPV4OR | 572 | 4/30/2020 8:26 | cmts01 | 24.209.29.0 | /22 | 255.255.252.0 | 1,024 | 49 |
| ADS_01900_IPV4OR | 572 | 4/30/2020 8:26 | cmts01 | 65.27.140.0 | /22 | 255.255.252.0 | 1,024 | 1,001 |
| ADS_01900_IPV4OR | 572 | 4/30/2020 8:26 | cmts01 | 65.185.118.0 | /23 | 255.255.254.0 | 512 | 14 |
| ADS_01900_IPV4OR | 572 | 4/30/2020 8:26 | cmts01 | 76.181.176.0 | /20 | 255.255.240.0 | 4,096 | 2,913 |
| ADS_01900_IPV4OR | 572 | 4/30/2020 8:26 | cmts01 | 107.9.0.0 | /19 | 255.255.224.0 | 8,192 | 7,875 |
| ADS_01900_IPV4OR | 572 | 4/30/2020 8:26 | cmts02 | 50.91.8.0 | /22 | 255.255.252.0 | 1,024 | 1,020 |
| ADS_01900_IPV4OR | 572 | 4/30/2020 8:26 | cmts02 | 50.91.68.0 | /24 | 255.255.255.0 | 256 | 251 |
| ADS_01900_IPV4OR | 572 | 4/30/2020 8:26 | cmts02 | 74.62.169.128 | /25 | 255.255.255.128 | 128 | 41 |
| ADS_01900_IPV4OR | 572 | 4/30/2020 8:26 | cmts02 | 75.113.64.0 | /19 | 255.255.224.0 | 8,192 | 4,838 |
| ADS_01900_IPV4OR | 572 | 4/30/2020 8:26 | cmts03 | 75.78.13.64 | /23 | 255.255.254.0 | 512 | 509 |
| ADS_01900_IPV4OR | 572 | 4/30/2020 8:26 | cmts03 | 97.78.15.0 | /26 | 255.255.255.192 | 64 | 45 |
| ADS_01900_IPV4OR | 572 | 4/30/2020 8:26 | cmts03 | 97.78.15.192 | /26 | 255.255.255.192 | 64 | 35 |
| ADS_01900_IPV4OR | 572 | 4/30/2020 8:26 | cmts03 | 104.137.128.0 | /21 | 255.255.248.0 | 2,048 | 476 |
| ADS_01900_IPV4OR | 572 | 4/30/2020 8:26 | cmts03 | 107.146.208.0 | /20 | 255.255.240.0 | 4,096 | 4,090 |
| ADS_01900_IPV4OR | 572 | 4/30/2020 8:26 | cmts03 | 174.135.96.0 | /19 | 255.255.224.0 | 8,192 | 5,191 |

FIG. 3

METHOD AND SYSTEM FOR INTERNET PROTOCOL ADDRESS ALLOCATION

CROSS REFERENCE TO RELATED APPLICATION

This application is a continuation of U.S. application Ser. No. 16/919,350 filed Jul. 2, 2020, of which is incorporated herein by reference.

TECHNICAL FIELD

This disclosure relates to network addressing. More specifically, this disclosure relates to real-time Internet Protocol addressing optimization.

BACKGROUND

Multiple-system operators (MSOs), cable companies, and the like (collectively "service providers") carry data traffic over their networks via fiber and coaxial cable. For example, MSO's Hybrid Fiber Coax (HFC) access networks carry the majority of the MSO's Internet cable data traffic. Networking and internetworking communication protocols are relied upon to carry data through the networks.

The Internet Protocol (IP) is the principal communications protocol in the Internet protocol suite for relaying and routing packets across the networks from a source to a destination. It describes the format of packets, the addressing scheme, and other specifications for network and computing devices to communicate over the network. Internet Protocol Version 4 (IPv4) is the fourth revision of the IP. IPv4 uses a 32-bit address scheme allowing for a total of $2^{32}$ IP addresses, where each IP address is a numerical label assigned to a device connected to the network. The IP address is a unique identifier for a device and each device needs its own IP address.

As evident, there is a limited number of IPv4 IP addresses. The rapid development of the Internet has reached a point where most IPv4 addresses have already been distributed. This rapid growth of Internet data traffic is requiring MSO's to allocate more and more of their limited IPv4 IP address inventory to high speed data subscribers prior to completion of the service provider's migration to the expanded address space enabled with IPv6, which is the sixth revision of the IP and uses a 128-bit address, theoretically allowing $2^{128}$ IP addresses.

IP address inventory is currently managed in a best-effort manner with no ability to define the absolute minimum number of IP address blocks required to meet network engineering constraints, to optimize IP address inventory levels based on projected usage, or optimize IP address market value over the time horizon required for migration from IPv4 to IPv6.

SUMMARY

Disclosed herein are method and systems for Internet Protocol (IP) address allocation optimization. In implementations, a method for improved Internet Protocol (IP) address allocation includes collecting, by a data collector, IP address information from sources of IP address inventory, generating, by an optimization controller, a data set based on the collected IP address information, minimizing, by the optimization controller, IP address allocations for network components in a network using at least IP address allocation and IP address utilization for a network component from the data set, minimizing, by the optimization controller, IP address inventory costs using at least IP address inventory and IP address utilization from the data set and IP address transactional costs, tracking, by the optimization controller, the IP address inventory using the data set, sending, by the optimization controller, configuration information to one or more network components to change respective IP address allocations based on minimized IP address allocation, sending, by the optimization controller, transaction information to one or more IP address providers to change the IP address inventory based on minimized IP address inventory costs, and performing, by the optimization controller, the collecting, the generating, the minimizing IP address allocations, the minimizing IP address inventory costs, the tracking, the sending configuration information, and the sending transaction information on a defined interval.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 3 is a diagram of an example analytics data set in accordance with embodiments of this disclosure.

DETAILED DESCRIPTION

Figure 1:
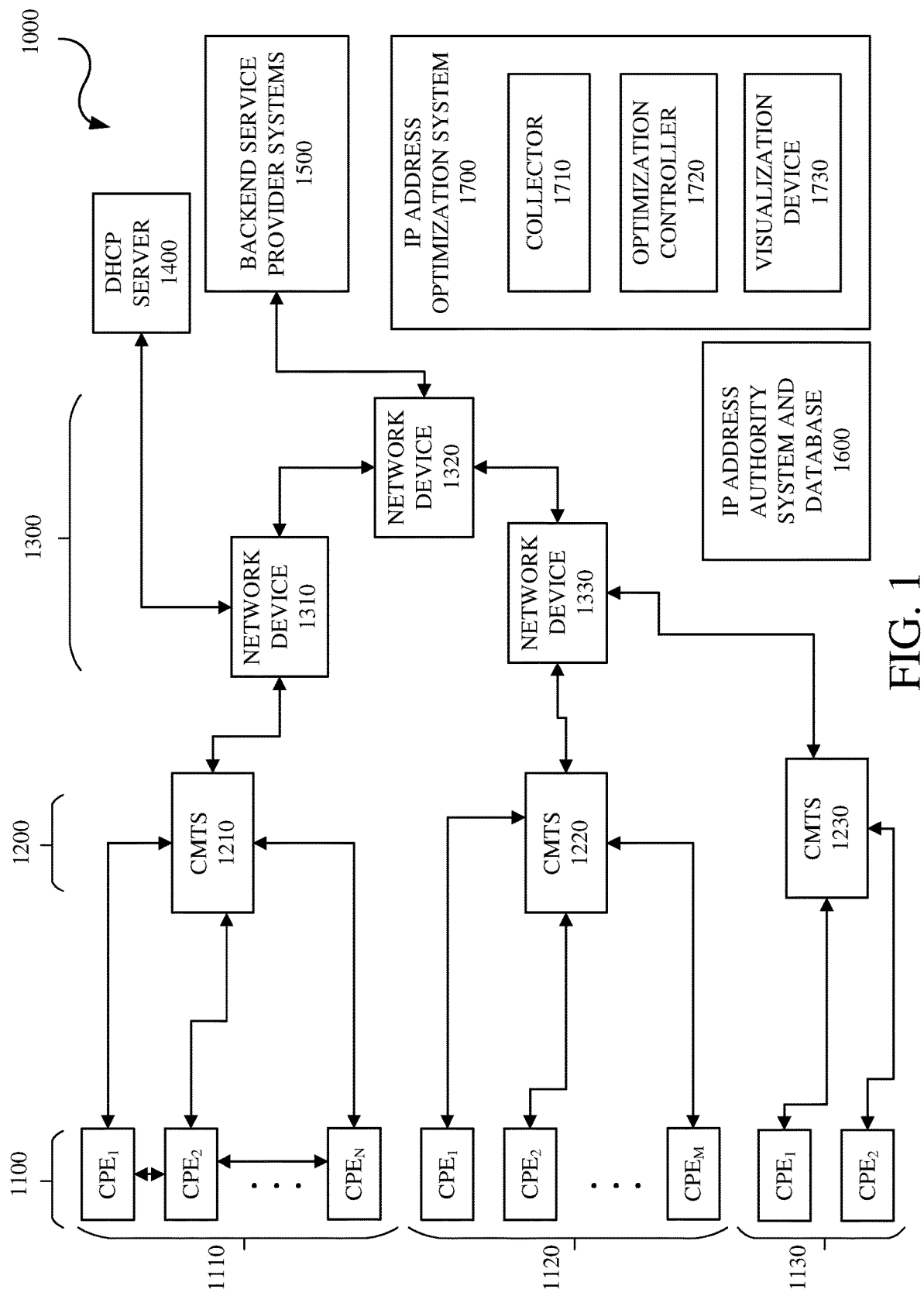
FIG. 1 is a diagram of an example network in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods and systems for Internet Protocol (IP) address allocation optimization. In an implementation, the described techniques optimize IP address usage by minimizing the number of IP addresses required to accommodate high speed internet traffic and maximizing the value of IP address inventory. IP addresses used in a service provider network are identified and analyzed for full utilization on a continuous and real-time basis.

In implementations, a data collector automatically pulls information from a variety of sources that host information about IP addresses on a network. These sources can include, but are not limited to, back office systems, network devices, and public systems such as American Registry for Internet Numbers (ARIN). Once all the sources are identified and polled for their IP address and IP usage information, a processor can organize the data to show the total number of addresses assigned by the controlling authority, total number of addresses configured, total number of addresses in actual use, and total addresses in reserve. The actual number of hosts that require IP addresses can be determined, for example, from the network devices. Based on this data, the processor can determine a best fit of IP address scope and size can be determined for each network device. An allocation processor can then use the best fit information to configure, for example, Dynamic Host Configuration Protocol (DHCP) servers and network devices.

In implementations, the described techniques enable efficient use of IP addresses by service providers. Efficiency is achieved by minimizing the number of IP addresses consumed and maximizing the value of buying and/or selling IP addresses to optimize IP address inventory. By fully optimizing the IP addressing scopes, the service provider can recover unused IP addresses without having the need to purchase additional addressing from the open market.

In implementations, a multi-faceted and cooperative technique is used optimize IP address allocation in a network. The technique includes generation of a data set from IP addresses associated with or related to network components part of or comprising the network. An integer programming optimization algorithm is used to minimize IP address allocations to the network components. A parametric model is used to track and trend IP address usage over time. A mixed integer linear programming econometric modeling algorithm is used to minimize IP address inventory costs over time.

In implementations, the multi-faceted and cooperative technique is used to identify an absolute minimum number of IP addresses required to operate segments of the network while maintaining an acceptable level of safety stock and while minimizing the associated buy, sell, and holding costs of the IP address inventory. The technique identifies a preferred timing of identified recovery initiatives, the amounts and timing of IP address block purchases, and the optimal allocation of IP addresses to subscribers and network components.

FIG. 1 is a diagram of an example network 1000 in accordance with some embodiments of this disclosure. The network 1000, can be, for example a service provider network. The network 1000 includes customer premise equipment (CPE) 1100 including $CPE_1$, $CPE_2$, ..., $CPE_N$ 1110, $CPE_1$, $CPE_2$, ..., $CPE_M$ 1120, $CPE_1$ and $CPE_2$ 1130, cable modem termination system (CMTS) 1200 including CMTS 1210, CMTS 1220, and CMTS 1230, network devices 1300 including network device 1310, network device 1320, and network device 1330, a DHCP server 1400, backend service provider systems 1500, an IP address authority system and 1600, and an IP address optimization system 1700. The $CPE_1$, $CPE_2$, ..., $CPE_N$ 1110, the $CPE_1$, $CPE_2$, ..., $CPE_M$ 1120, the $CPE_1$ and $CPE_2$ 1130, the CMTS 1210, the CMTS 1220, the CMTS 1230, the network device 1310, the network device 1320, the network device 1330, the DHCP server 1400, the backend service provider systems 1500, the IP address authority system and database 1600, and the IP address optimization system 1700 can be connected to or be in communication with (collectively "connected to") each other, as appropriate and applicable, using wired and wireless techniques, systems, and devices, including but not limited to, hybrid coaxial fiber, coaxial fiber, the Internet, an intranet, a low power wide area network (LP-WAN), a local area network (LAN), a wide area network (WAN), a public network, a private network, a cellular network, a WiFi-based network, a telephone network, a landline network, a public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. The network 1000 and the components therein may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The CPEs 1100, can be, but are not limited to, end user devices, telephones, routers, network switches, gateways, set-top boxes, fixed mobile convergence products, home networking adapters and Internet access gateways that enable customers to access a service provider's services and distribute them in a residence, enterprise, office, or like infrastructure. In an implementation, the CPEs 1100 may be equipment located at a customer's premises and connected with a service provider's telecommunication equipment, including for example, CMTS 1200. The CMTS' 1200 are typically located in a service provider's central office, headend or hubsite and provide high speed data services, such as cable Internet or Voice over Internet Protocol, to service provider subscribers.

The network devices 1300 can be, but is not limited to, routers, gateway devices, edge network devices, access network devices, core network devices, and like devices which provide connectivity including Internet connectivity, wired connectivity, wireless connectivity, and combinations thereof.

The DHCP server 1400 can be a server which uses DHCP to provide the initial and updated network configurations (referred to as DHCP options) and services to requesting devices such as the CPEs 1100, the CMTS' 1200, and the network devices 1300, for example. The DHCP is a network management protocol used by the DHCP server 1400 to dynamically assign an IP address and other network configuration parameters to each device on a network so the device can communicate with other network elements or devices.

The backend service provider systems 1500, can include, internal IP management systems, Syslog, access control systems, firmware management systems, IP2MAC correlation engines, and the like.

The IP address authority system and database 1600 can be an Internet registry which provides and manages the distribution of Internet number resources, including IPv4 and IPv6 IP addresses. For example, the IP address authority system and database 1600 can be ARIN, which is a regional Internet registry that handles IP addresses in the United States among other countries.

The IP address optimization system 1700 includes a collector 1710, an optimization controller 1720, and a visualization device 1730. The collector 1710 collects IP address information from each component in the network 1000, such as the CPEs 1100, the CMTS' 1200, the network devices 1300, the DHCP server 1400, the backend service provider systems 1500, the IP address authority system and database 1600, and the like. The optimization controller 1720 organizes the collected data, performs econometric analysis on the data to control IP address inventory decisions, tracks IP address trends from the data using the visualization device 1730, and performs allocation optimization to efficiently allocate IP addresses to the components.

Figure 2:
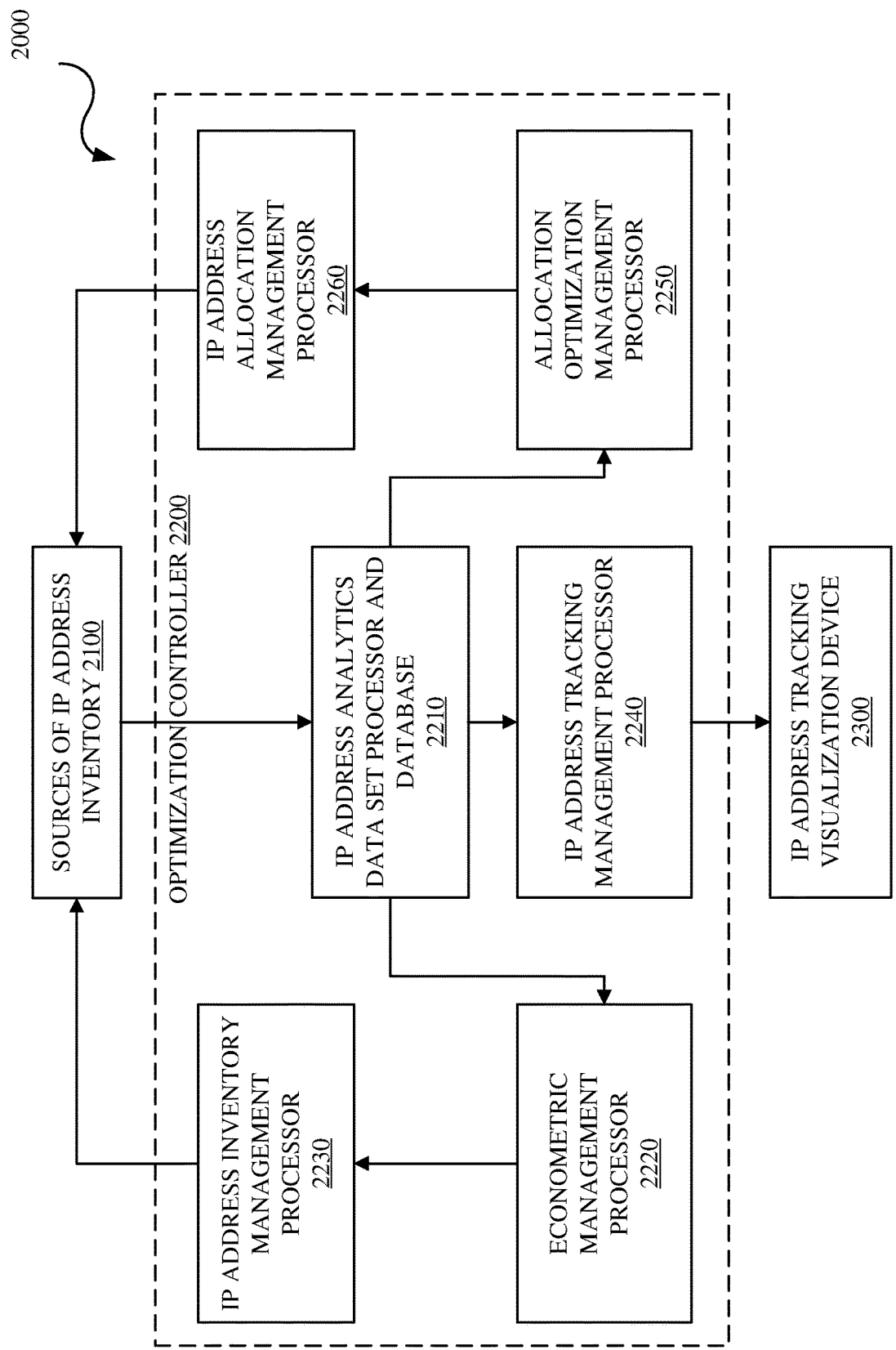
FIG. 2 is a diagram of an example Internet Protocol (IP) address allocation optimization flow in accordance with embodiments of this disclosure.

FIG. 2 is a diagram of an example IP address allocation optimization flow diagram 2000 in accordance with embodiments of this disclosure. The IP address allocation optimization flow diagram 2000 describes communications and events with respect to sources of IP address inventory 2100, an optimization controller or processor 2200, and an IP address tracking visualization device 2300. The optimization controller 2200 can include, but is not limited to, an IP address analytics data set processor and database 2210, an econometric management processor 2220, an IP address inventory management processor 2230, an IP address tracking management processor 2240, an allocation optimization management processor 2250, and an IP address allocation management processor 2260.

Operationally, with reference to FIG. 1 and FIG. 2, the IP address analytics data set processor and database 2210 (or the collector 1710) can create or update an Analytics Data Set (ADS) from the sources of IP address inventory 2100, which consists of all network component IP addresses in a network including but not limited to, current network inventory and component configuration sources. For example, the ADS can include IP addresses from the $CPE_1$, $CPE_2$, ..., $CPE_N$ 1110, the $CPE_1$, $CPE_2$, ..., $CPE_M$ 1120, the $CPE_1$ and CPE₂ 1130, the CMTS 1210, the CMTS 1220, the CMTS 1230, the network device 1310, the network device 1320, the network device 1330, the DHCP server 1400, the backend service provider systems 1500, and the IP address authority system and database 1600. In implementations, the network component IP addresses can be captured at a defined period, including but not limited to, daily, hourly, event driven, or combinations thereof. The allocation optimization management processor 2250 (or optimization controller 1720) analyzes the ADS to identify IP full block IP address scopes that can be freed up for reallocation using a full block IP address allocation optimization model, where a scope is a range of IP addresses. IP address reconfigurations are performed or initiated by the IP address allocation management processor 2260. The econometric management processor 2220 analyzes the ADS to optimize timing of IP address recovery initiatives, purchases, and sales, by the IP address inventory management processor 2230, based on burn rates and inventory value using an economic optimization model. The IP address tracking management processor 2240 analyzes the ADS to track and trend growth, quantify optimization results, and synchronize inventory across multiple organizations using a parametric model, and via the IP address tracking visualization device 2300 (or visualization device 1730), provides visualization of the ADS. The IP address allocation optimization and configuration is a continuous and automated closed-loop process.

As stated, the IP address analytics data set processor and database 2210 (or the collector 1710) can create or update the ADS from the sources of IP address inventory 2100. In implementations, the IP addresses are IPv4 IP addresses, IPv6 IP addresses, or combinations thereof. IP addresses are allocated or assigned to network components as blocks in any variety of Classless Inter-Domain Routing (CIDR) block sizes. For example, the network components can be CMTS 1210, CMTS 1220, and CMTS 1230. These sets of IP address blocks define a pool of IP addresses available for assignment to high speed Internet components on the network. For example, the high speed Internet components can be CPE₁, CPE₂, . . . , CPE_N 1110, the CPE₁, CPE₂, . . . , CPE_M 1120, and the CPE₁ and CPE₂ 1130. The ADS captures those allocations (the pools) on a defined time interval along with the number of IP addresses that are active or leased out of the pools.

The ADS is a 1NF data base that is essentially a flat file in a form capable of being easily ingested into any variety of visualization tools and/or structured databases. FIG. 3 is a diagram of an example ADS 3000 in accordance with embodiments of this disclosure. Each row 3100 of the ADS 3000 contains a large number of columns identifying time of capture 3110, ADS versioning 3120, ADS name 3130, network component vendor and plant location associations, and like information. The ADS name 3130 and version 3120 can be used for tracking when ADS components/columns or their formats may have changed under a previous version. The ADS, for example the ADS 3000, is a single ADS which contains data from all of the IP address captures. Consequently, each row 3100 contains the time of capture 3110 of the IP address capture. Each row 3100 includes a unique identifier based on a component/hostname 3140 combined with a network id 3150. The full IP address scope incorporating the combination of the component name 3140, the network ID IP address 3150, and a CIDR block size 3160 is also contained in the ADS 3000 as a separate column for ease of reference. A CIDR block identifier along with the network ID IP address 3150 identifies a total number of IP addresses 3170 in the block starting with the network ID IP address 3150. A subnet mask 3180 is provided in the ADS 300 for use in easily generating the full list of IP addresses. The total number of IP addresses 3170 and a leased number of IP addresses 3190 identify the number of IP addresses of the CIDR block allocated to the network component along with the number of the allocated IP addresses that are currently active or leased.

As stated, the allocation optimization management processor 2250 analyzes the ADS 3000 to identify IP full block IP address scopes that can be freed up for reallocation using a full block IP address allocation optimization model. A network component (as represented by each row 3100 in FIG. 3) is allocated multiple blocks of IP addresses. The full-block IP address optimization algorithm find an optimal mix of those currently allocated blocks that will meet the network component IP address demand while freeing up as many IP addresses as possible for reallocation to other network components, for example. This can be represented as follows:

$$\text{Maximize: } \sum_{i=1}^{12} 2^{(i+2)} x_i \qquad \text{Equation (1)}$$

$$\text{Subject to: } x_i \leq N_i \forall\, i, i = 1, \ldots, 12$$

$$\sum_{i=1}^{12} 2^{(i+2)} x_i \leq IPAlloc - \frac{IPUtil}{MaxUtl\ \%}$$

$$x_i \geq 0, \text{ integer}$$

where $x_i$ is equal to the number of blocks of size i containing $2^{(i+2)}$ IP addresses to be removed, $N_i$ is equal to the number of blocks of size i (e.g. CIDR blocks /29 through /18) currently allocated, IPAlloc is equal to the number of IP addresses currently allocated, IPUtil is equal to the number of IP addresses currently utilized, and MaxUtl % is equal to the maximum percent of IP address utilization allowed.

The full-block IP address optimization algorithm as represented by Equation 1 attempts to maximize the number of IP addresses that can be released from a network component. In implementations, the IP addresses are allocated in CIDR blocks. Accordingly, the full-block IP address optimization algorithm determines the set of CIDR blocks that can be released resulting in the maximum number of freed IP addresses. The full-block IP address optimization algorithm is constrained by the number of CIDR blocks currently allocated to the network component, defining the set of IP addresses of a certain block type that are eligible for release. The constraints also limit the number of IP addresses that can be released while still ensuring that a certain amount of safety stock is retained. In implementations, the full-block IP address optimization algorithm defines releases that stay within a certain percentage of the total IP addresses allocated. In implementations, the full-block IP address optimization algorithm defines releases by stating the safety stock as a specific number of IP addresses. This allows the constraint to vary by regional growth variations, sizes of network component subscriber pools, and the like. In implementations, another set of constraints limits the number of released blocks to integer values. This ensures that only full blocks of addresses are released versus splitting into multiple smaller blocks. Optimization results have not shown the need to split blocks to gain substantial improvements in allocation effectiveness.

The full-block IP address optimization algorithm uses an integer programming deterministic optimization algorithm versus a heuristic or artificial intelligence approach. The deterministic optimization algorithm evaluates every possible combination of releases, therefore ensuring that the optimization solution is defining the maximum number of releases possible under the stated engineering constraints. While there may be multiple optimal sets of releases, the total number of IP address releases identified by the full-block IP address optimization algorithm is the absolute best possible.

The IP address allocation management processor 2260 uses the results from the allocation optimization management processor 2250 and configures a DHCP, network component, or combinations thereof to re-allocate IP address blocks and free up IP address blocks. The new allocations are then used in a next IP address allocation optimization cycle.

As stated, the econometric management processor 2220 analyzes the ADS to optimize timing of IP address recovery initiatives, purchases, and sales based on burn rates and inventory value using an economic optimization model. IP address inventory fluctuates over time. Decreases in safety stock allocations, purchases of IP addresses, reallocation of IP addresses into the network IP address pool, and implementations of IP address recovery initiatives, all increase the number of IP addresses in the IP address inventory. The burn or use of IP addresses to accommodate subscriber growth, increases in safety stock allocations to network components, implementation of IP address resource recovery initiatives that may require an initial increase in IP address usage, and the sale of IP addresses, all decrease the number of IP addresses in the IP address inventory for a given quarter. The economic optimization model identifies the optimal levels of these activities over time that will result in minimum total cost. This can be represented as follows:

$$\text{Maximize:} \sum_{i=1}^{Q} (h * x_i - d_i c_i u_i + c_i v_i) \quad \text{Equation (2)}$$

$$\text{Subject to: } x_i - u_i + v_i - y_i + \sum_{j=1}^{N} r_j z_{ij} - x(i+1) = 0 \ \forall \ i, i = 1, \ldots, Q$$

$$x_1 = IPIint$$

$$x_i \geq IPMin \ \forall \ i, i = 1, \ldots, Q$$

$$y_i = BURN_i \ \forall \ i, i = 1, \ldots, Q$$

$$\sum_{i=1}^{Q} z_{ij} \leq 1 \ \forall \ j, j = 1, \ldots, N$$

where $x_i$ is equal to IPv4 IP address inventory in quarter i, $u_i$ is equal to IPv4 IP addresses sold in quarter i, $v_i$ is equal to IPv4 IP addresses bought in quarter i, $y_i$ is equal to IPv4 IP addresses used in quarter i, $z_{ij}$ is equal to 1 if resource recovery initiative j is implemented in quarter i and is equal to 0 otherwise, IPInit is equal to the beginning IPv4 IP address inventory, IPMin is equal to the minimum inventory to be carried each quarter, $BURN_i$ is equal to the IPv4 IP addresses required for use in each quarter i, h is equal to the cost of holding an IPv4 IP address for a quarter, $d_i$ is equal to the discount percentage for selling IP addresses in quarter i, $c_i$ is equal to the cost to buy an IP address in quarter i, $r_i$ is equal to IPv4 IP addresses recoverable in quarter i, Q is equal to the number of quarterly time periods, and N is equal to the number of IPv4 resource recovery initiatives. In implementations, certain of the factors or constraints, such as but not limited to, h, $d_i$, $c_i$, can be stated as transactional costs.

The economic optimization model specifically minimizes cost minus revenue where cost is generated by buying IP addresses or holding unused IP address inventory for a full quarter and revenue is generated through the sale of IP addresses. The economic optimization model includes a holding cost for IP addresses, a purchase price for acquiring IP addresses, and a discount factor for the sale of IP address inventory.

The economic optimization model is subject to a number of constraints. One constraint is the material balance constraint that assures that the beginning quarterly inventory of IP addresses minus sales plus purchases minus burn or usage of IP addresses plus recovered IP addresses equals the quarterly ending inventory. Other constraints set the value of the initial IP address inventory (IPInit), define the minimum safety stock inventory level required or desired each quarter, and set the burn rate projected for each quarter of the economic optimization model's planning period. Another set of modeling constraints sets the recovery amounts expected from IP address recovery initiatives. For recovery initiatives the economic optimization model constrains the time of recovery to a single quarter. In implementations, recovery initiatives that span more than a single quarter are assumed to have fixed timing in the economic optimization model. In implementations, the economic optimization model includes variable timing and dependency constraints for multi-quarter initiatives.

The IP address inventory management processor 2230 times buy, sell, recovery, hold, and other actions with respect to IP addresses based on the results from the economic optimization model. The IP address inventory changes are then used in the next IP address allocation optimization cycle.

As stated, the IP address tracking management processor 2240 analyzes the ADS to track and trend growth, quantify optimization results, and synchronize inventory across multiple organizations using a parametric model. Detailed and accurate tracking of IP address inventory ensures recognizing optimization results and obtaining the expected results from identified IP address recovery initiatives.

Parametric modeling uses the ADS to set a variety of parameters that define different views of the IP address inventory via the IP address tracking visualization device 2300. Viewing total IP address inventory, IP address inventory by region, IP address inventory by hub, or IP address inventory by individual network component is easily provided through a variety of visualization tools once the ADS is established and maintained or updated. In implementations, visualizations at a daily level of currency is maintained due to the number of changes and the total volume impact that can occur over changes made to IP address inventory.

All IP address inventory history is maintained in the ADS. Parameters of the model allow different date ranges to be evaluated independently. Deltas in values from a given start date is available through parameter settings in the descriptive model.

The parametric model also enables users to calculate a variety of metrics associated with recovery initiatives. Some of the metrics are specific to individual recovery initiatives (e.g. sharing ratios as the HFC Access Network migrates from IPv4 to IPv6 and allocation vs. lease percentage statistics as CMTS block allocations change through use of the full block address optimization model). Reference lines can be set in the parametric model to aid in tracking projected gains versus actual/realized.

Figure 4:
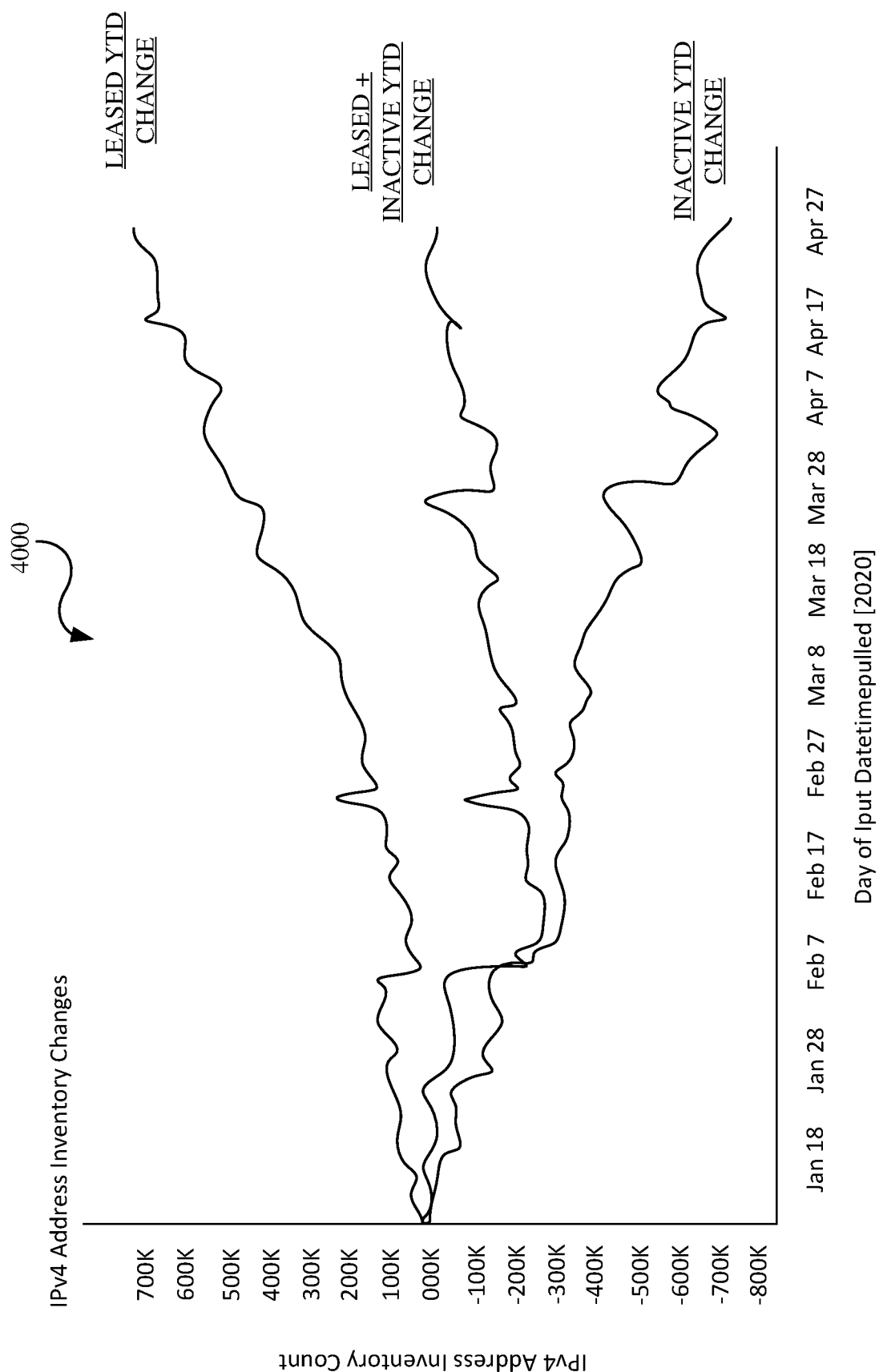
FIG. 4 is a graph of IP address inventory changes in accordance with embodiments of this disclosure.

FIG. 4 is a graph 4000 of a sample parametric model visualization describing the IPv4 inventory changes associated with an HFC access network. The visualization is based on a parameterized start date. The visualizations identify inventory allocation improvements and IP address burn rates. The sample visualization shown has identified anomalies in the inventory values kept across different organizations, has accurately quantified inventory resource recovery improvements, and has enabled root cause correction in a very short time frame when trends began to vary from projections.

Figure 5:
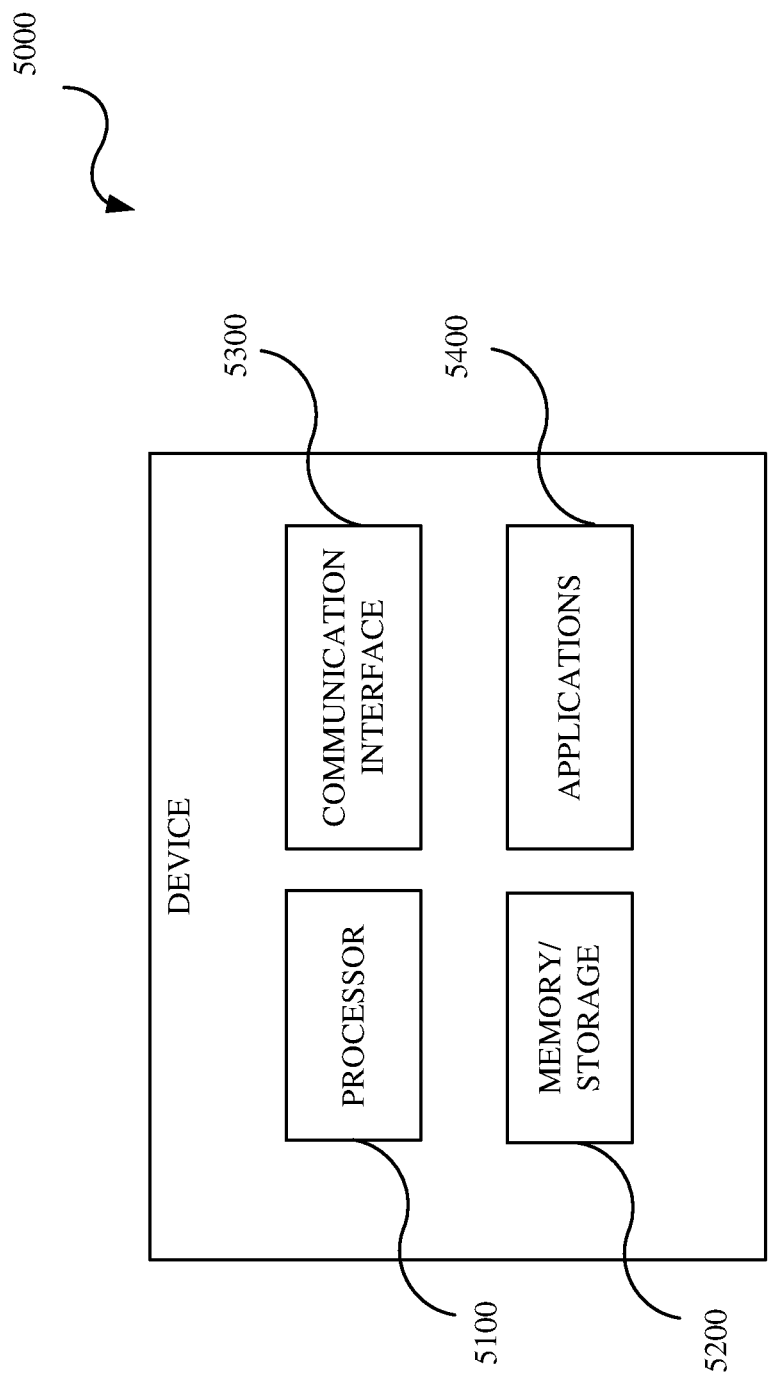
FIG. 5 is a block diagram of an example of a device in accordance with embodiments of this disclosure.

FIG. 5 is a block diagram of an example of a device 5000 in accordance with embodiments of this disclosure. The device 5000 may include, but is not limited to, a processor 5100, a memory/storage 5200, a communication interface 5300, and applications 5400. The device 5000 may include or implement, for example, the $CPE_1$, $CPE_2$, ..., $CPE_N$ 1110, the $CPE_1$, $CPE_2$, ..., $CPE_M$ 1120, the $CPE_1$ and $CPE_2$ 1130, the CMTS 1210, CMTS 1220, and CMTS 1230, the network device 1310, the network device 1320, the network device 1330, the DHCP server 1400, the backend service provider systems 1500, the IP address authority system and database 1600, the IP address optimization system 1700, the IP address inventory 2100, the optimization controller 2200, the IP address tracking visualization device 2300, the IP address analytics data set processor and database 2210, the econometric management processor 2220, the IP address inventory management processor 2230, the IP address tracking management processor 2240, the allocation optimization management processor 2250, and the IP address allocation management processor 2260. In an implementation, appropriate memory/storage 5200 may store the ADS and the like. In an implementation, appropriate memory/storage 5200 is encoded with instructions for at least collecting IP addresses, creating or updating the ADS, identifying IP full block IP address scopes that can be freed up for reallocation, optimize timing of IP address recovery initiatives, purchases, and sales, tracking and trending growth, quantifying optimization results, synchronizing inventory, and the like. The IP address allocation techniques or methods described herein may be stored in appropriate memory/storage 5200 and executed by the appropriate processor 5100 in cooperation with the memory/storage 5200, the communications interface 5300, and applications 5400, as appropriate. The device 5000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 6:
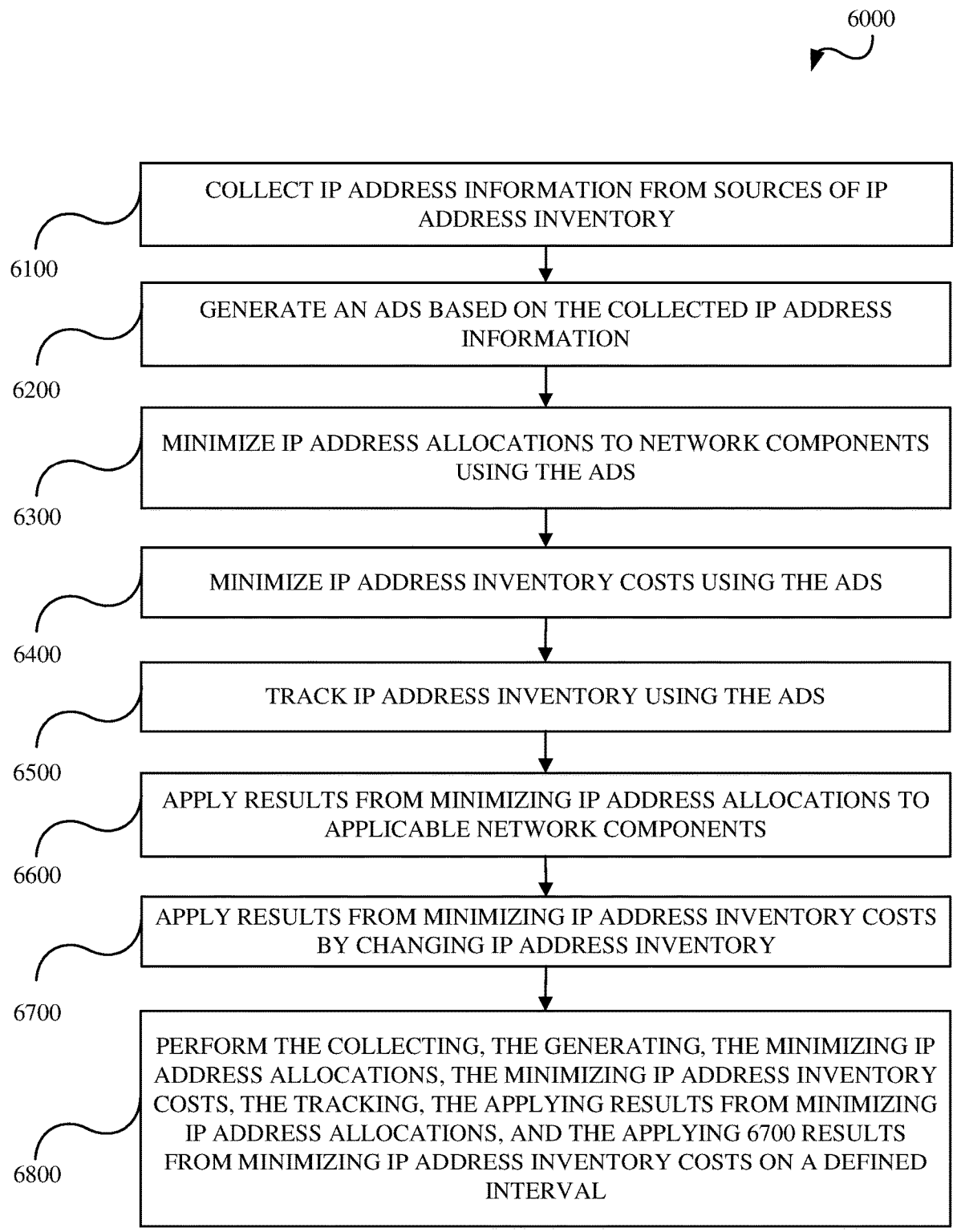
FIG. 6 is a flowchart of an example method for IP address allocation optimization in accordance with embodiments of this disclosure.

FIG. 6 is a flowchart of an example method 6000 for IP address allocation optimization in accordance with embodiments of this disclosure. The method 6000 includes: collecting 6100 IP address information from sources of IP address inventory; generating 6200 an ADS based on the collected IP address information; minimizing 6300 IP address allocations to network components using the ADS; minimizing 6400 IP address inventory costs using the ADS; tracking 6500 IP address inventory using the ADS; applying 6600 results from minimizing IP address allocations to applicable network components; applying 6700 results from minimizing IP address inventory costs by changing IP address inventory; performing 6800 the collecting, the generating, the minimizing IP address allocations, the minimizing IP address inventory costs, the tracking, the applying results from minimizing IP address allocations, and the applying 6700 results from minimizing IP address inventory costs on a defined interval. For example, the method 6000 may be implemented, as applicable and appropriate, by the $CPE_1$, $CPE_2$, ..., $CPE_N$ 1110, the $CPE_1$, $CPE_2$, ..., $CPE_M$ 1120, the $CPE_1$ and $CPE_2$ 1130, the CMTS 1210, CMTS 1220, and CMTS 1230, the network device 1310, the network device 1320, the network device 1330, the DHCP server 1400, the backend service provider systems 1500, the IP address authority system and database 1600, the IP address optimization system 1700, the IP address inventory 2100, the optimization controller 2200, the IP address tracking visualization device 2300, the IP address analytics data set processor and database 2210, the econometric management processor 2220, the IP address inventory management processor 2230, the IP address tracking management processor 2240, the allocation optimization management processor 2250, the IP address allocation management processor 2260, the processor 5100, the memory/storage 5200, the communication interface 5300, and the applications 5400.

The method 6000 includes collecting 6100 IP address information from sources of IP address inventory. The sources of IP address inventory include, but are not limited to, sources which provide IP addresses, sources which provision IP addresses, sources which use IP addresses, and the like. Sources can be network components, public sources, and the like.

The method 6000 includes generating 6200 an ADS based on the collected IP address information. The collected IP address information is processed and saved in a database where each row can represent a source of IP addresses with characterization information including, but not limited to, time of collection, starting IP address for IP address block or IP address scope, hostname, network ID, block size, number of total or allocated IP addresses, number of leased, used, or utilized (collectively "utilized") IP addresses, and the like.

The method 6000 includes minimizing 6300 IP address allocations to network components using the ADS. The minimization technique employs Dan integer programming deterministic optimization algorithm to evaluate the ADS and determine for each network component having an allocated number of IP addresses, the maximum number of releases subject to defined constraints. In implementations, the defined constraints can include a safety stock of IP addresses or maximum utilization rate for each network component. In implementations, the defined constraints restrict releases to defined block sizes such as for example CIDR block sizes.

The method 6000 includes minimizing 6400 IP address inventory costs using the ADS. The IP address inventory has costs associated with buying, selling, and holding IP addresses. The minimization optimizes the buying, selling, and holding of the IP addresses subject to defined constraints. In implementations, the minimization is done over a defined period of time. The defined constraints can include, but is not limited to, a safety stock of IP addresses or maximum utilization rate for the defined period of time, a projected burn rate for the defined period of time, initial value for IP address inventory for the defined period of time, projected recovery amounts (i.e., released IP address blocks subject to re-allocated IP address blocks), and the like. In implementations, the projected recovery amounts are for the defined period of time. In implementations, the projected recovery amounts are prorated over multiples of the defined period of time.

The method 6000 includes tracking 6500 IP address inventory using the ADS. A variety of parameters can be tracked and visualized with respect to changes in the ADS due to minimizing IP address allocations to applicable network components and minimizing IP address inventory costs by changing IP address inventory. The parameters include, but are not limited to, IP address inventory, IP address usage or utilization, IP address allocation, IP addresses recovered, IP addresses sold, IP addresses bought, and the like, where each parameter can be viewed by region, by network component, or like attribute. In implementations, the tracking can be viewed over defined time periods. In implementations, the tracking can be updated on a defined time period, periodically, event driven, or combinations thereof.

The method 6000 includes applying 6600 results from minimizing IP address allocations to applicable network components. Configuration information can be sent to network components, DHCP servers, combinations thereof, and the like to allocate different IP address blocks and release current IP address blocks being used by applicable or appropriate network components resulting in improved usage of IP addresses.

The method 6000 includes applying 6700 results from minimizing IP address inventory costs by changing IP address inventory. Transaction information can be sent to IP address providers to change the IP address inventory based on selling, buying, or combinations thereof of IP addresses.

The method 6000 includes performing 6800 the collecting, the generating, the minimizing IP address allocations, the minimizing IP address inventory costs, the tracking, the applying results from minimizing IP address allocations, and the applying 6700 results from minimizing IP address inventory costs on a defined interval. Updates to the IP address inventory based on usage, buying, selling, and the like can automatically occur on a continual basis, defined period of time, event driven, or combinations thereof to optimize IP address allocation in the network and with respect to network components.

In general, a method for improved Internet Protocol (IP) address allocation includes collecting, by a data collector, IP address information from sources of IP address inventory, generating, by an optimization controller, a data set based on the collected IP address information, minimizing, by the optimization controller, IP address allocations for network components in a network using at least IP address allocation and IP address utilization for a network component from the data set, minimizing, by the optimization controller, IP address inventory costs using at least IP address inventory and IP address utilization from the data set and IP address transactional costs, tracking, by the optimization controller, the IP address inventory using the data set, sending, by the optimization controller, configuration information to one or more network components to change respective IP address allocations based on minimized IP address allocation, sending, by the optimization controller, transaction information to one or more IP address providers to change the IP address inventory based on minimized IP address inventory costs, and performing, by the optimization controller, the collecting, the generating, the minimizing IP address allocations, the minimizing IP address inventory costs, the tracking, the sending configuration information, and the sending transaction information on a defined interval. In implementations, the minimizing IP address allocations maximizes the number of IP addresses that can be released from the network component based on a defined block size. In implementations, the minimizing IP address allocations uses at least a defined safety stock of IP addresses for each network component. In implementations, the safety stock is one of a defined number of IP addresses or a defined percentage of the IP address allocation. In implementations, the minimizing IP address allocations implements an integer programming deterministic optimization algorithm to evaluate each combination of releases to determine a maximum number of releases possible under defined constraints. In implementations, wherein the minimizing IP address inventory costs optimizes timing of IP address recovery initiatives or IP address allocation releases and the IP address transactional costs, wherein the timing is based on IP address utilization rates and IP address inventory value. In implementations, the IP address transactional costs include at least IP address purchases, IP address sales, and value of holding defined IP addresses. In implementations, the minimizing IP address inventory costs uses at least a defined safety stock of IP addresses. In implementations, the minimizing IP address inventory costs is performed over a defined period of time.

In general, a system includes a memory and a processor in communication with the memory. The processor configured to generate a data set based on Internet Protocol (IP) address information collected from a network, optimize IP address allocations for network components in the network using at least IP address allocation and IP address utilization for a network component from the data set, optimize IP address inventory costs using IP address transactional cost data and at least IP address inventory and IP address utilization from the data set, track the IP address inventory using the data set, send configuration information to one or more network components to change respective IP address allocations based on optimized IP address allocation, send transaction information to one or more IP address providers to change the IP address inventory based on optimized IP address inventory costs, and update IP address allocation optimization, IP address inventory cost optimization, the configuration information, and the transaction information on a defined interval. In implementations, the IP address allocation optimization maximizes the number of IP addresses that can be released from the network component based on a defined block size. In implementations, the IP address allocation optimization uses at least a defined safety stock of IP addresses for each network component. In implementations, the safety stock is one of a defined number of IP addresses or a defined percentage of the IP address allocation. In implementations, the IP address allocation optimization implements an integer programming deterministic optimization algorithm to evaluate each combination of releases to determine a maximum number of releases possible under defined constraints. In implementations, the IP address inventory cost optimization optimizes timing of IP address recovery initiatives or IP address allocation releases and the IP address transactional costs, wherein the timing is based on IP address utilization rates and IP address inventory value. In implementations, the IP address transactional costs include at least IP address purchases, IP address sales, and value of holding defined IP addresses. In implementations, the IP address inventory cost optimization uses at least a defined safety stock of IP addresses. In implementations, the IP address inventory cost optimization is performed over a defined period of time.

In general, a method for improved Internet Protocol (IP) address allocation includes generating, by an IP address optimization processor, a data set based on IP address information collected from network, the data set including at least IP address allocation, IP address utilization, and IP address inventory on a network level and on a network component level, minimizing, by the IP address optimization processor, IP address allocations for network components in the network by maximizing number of releasable IP addresses for the respective network components, wherein minimization accounts for the IP address allocation and the IP address utilization for a network component, minimizing, by the IP address optimization processor, IP address inventory costs by optimizing timing of IP address allocation releases and IP address transactional costs, wherein the timing is based on the IP address utilization and IP address inventory value, tracking, by the IP address optimization processor, the IP address, executing, by the IP address optimization processor, configuration changes at respective to network components to recover IP addresses based on releasable IP addresses, executing, by the IP address optimization processor, transactions at IP address providers to change the IP address inventory based on minimized IP address inventory costs, and executing, by the IP address optimization processor, the generating, the minimizing IP address allocations, the minimizing IP address inventory costs, the tracking, the executing configuration changes, and the executing transactions on a defined interval. In implementations, the minimizing IP address allocations and the minimizing IP address inventory costs constrain optimization by using a defined minimum utilization percentage of IP address allocation.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as JAVA (JAVA is a registered trademark of Oracle and/or its affiliates), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (FAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for improved Internet Protocol (IP) address allocation, the method comprising:
   minimizing, by an optimization controller and based on IP address information included in an IP address inventory for network components, IP address allocations for the network components using at least IP address allocation and IP address utilization for a network component of the network components,
      wherein a data set includes the IP address inventory for the network components, and
      wherein the IP address inventory includes the IP address information of the network components;
   minimizing, by the optimization controller, IP address inventory costs by using at least the IP address inventory, the IP address utilization, and minimizing IP address transactional costs, wherein the minimizing the IP address inventory costs optimizes timing of IP address recovery initiatives, IP address allocation releases, and the IP address transactional costs, wherein the timing is based on IP address utilization rates and IP address inventory value;
   sending, by an optimization controller, configuration information to applicable one or more network components of the network components to change respective IP address allocations of the applicable one or more network components based on the minimized IP address allocations; and
   sending, by the optimization controller, transaction information to one or more IP address providers to change respective IP address inventories of the one or more IP address providers based on the minimized IP address inventory costs.

2. The method of claim 1, wherein the minimizing the IP address allocations for the network components maximizes a number of IP addresses that can be released from the network components based on a defined block size.

3. The method of claim 1, wherein the minimizing the IP address allocations for the network components in the network uses at least a defined safety stock of IP addresses for each of the network components.

4. The method of claim 3, wherein the safety stock is one of a defined number of IP addresses or a defined percentage of the minimized IP address allocations.

5. The method of claim 1, wherein the minimizing the IP address allocations for the network components implements an integer programming deterministic optimization algorithm to evaluate each combination of releases to determine a maximum number of the releases possible under defined constraints.

6. The method of claim 1, wherein the IP address transactional costs include at least IP address purchases, IP address sales, and value of holding defined IP addresses.

7. The method of claim 1, wherein the minimizing the IP address inventory costs uses the at least a defined safety stock of IP addresses.

8. The method of claim 1, wherein the minimizing the IP address inventory costs is performed over a defined period of time.

9. A system comprising:
   a memory; and
   a processor in communication with the memory, the processor configured to:
      minimize IP address allocations for network components in a network using at least IP address allocation and IP address utilization for a network component of the network components, wherein a data set includes IP address information of the network components;
      optimize IP address inventory costs using IP address transactional cost data and at least IP address inventory and the IP address utilization based on the data set, wherein optimization of the IP address inventory costs optimizes timing of IP address recovery initiatives, IP address allocation releases, and IP address transactional costs, wherein the timing is based on IP address utilization rates and IP address inventory value;
      send configuration information to applicable one or more network components of the network components to change respective IP address allocations of the applicable one or more network components based on the minimized IP address allocations; and
      send transaction information to one or more IP address providers to change respective IP address inventories of the one or more IP address providers based on the optimized IP address inventory costs.

10. The system of claim 9, wherein the minimizing the IP address allocations maximizes a number of IP addresses that can be released from the network component based on a defined block size.

11. The system of claim 10, wherein the minimizing the IP address allocations implements an integer programming deterministic optimization algorithm to evaluate each combination of releases to determine a maximum number of the releases possible under defined constraints.

12. The system of claim 10, wherein the optimizing the IP address inventory costs uses the at least a defined safety stock of IP addresses.

13. The system of claim 10, wherein the optimizing the IP address inventory costs is performed over a defined period of time.

14. The system of claim 9, wherein the minimizing the IP address allocations uses at least a defined safety stock of IP addresses for each of the network components.

15. The system of claim 14, wherein the safety stock is one of a defined number of IP addresses or a defined percentage of the minimized IP address allocations.

16. The system of claim 9, wherein the IP address transactional costs include at least IP address purchases, IP address sales, and value of holding defined IP addresses.

* * * * *